United States Patent
Chang

(10) Patent No.: US 12,371,562 B2
(45) Date of Patent: Jul. 29, 2025

(54) RECYCLED PET BLEND PROCESSING METHOD

(71) Applicant: POLYQUANTUM MATERIALS CORPORATION, Taichung (TW)

(72) Inventor: Chung Hung Chang, Taichung (TW)

(73) Assignee: PolyQuantum Materials Corporation, Taichung (TW)

( * ) Notice: Subject to any disclaimer, the term of this patent is extended or adjusted under 35 U.S.C. 154(b) by 360 days.

(21) Appl. No.: 18/051,553

(22) Filed: Nov. 1, 2022

(65) Prior Publication Data
US 2023/0323113 A1 Oct. 12, 2023

(30) Foreign Application Priority Data
Apr. 6, 2022 (TW) .................................. 111113038

(51) Int. Cl.
*C08L 67/03* (2006.01)
*C08J 3/20* (2006.01)

(52) U.S. Cl.
CPC ................. *C08L 67/03* (2013.01); *C08J 3/20* (2013.01); *C08L 2207/20* (2013.01)

(58) Field of Classification Search
CPC ......... C08L 67/03; C08L 2207/20; C08J 3/20; Y02W 30/62
See application file for complete search history.

(56) References Cited

U.S. PATENT DOCUMENTS

| 2001/0004645 A1* | 6/2001 | Robinson ............... B29C 48/287 521/48 |
| 2015/0225562 A1* | 8/2015 | Escobar Barrios et al. ................. C08L 33/02 525/95 |

FOREIGN PATENT DOCUMENTS

| CN | 101535018 A | 9/2009 | |
| CN | 112175325 A | 1/2021 | |
| TW | I633139 B1 * | 8/2018 | ............... C08K 3/04 |

OTHER PUBLICATIONS

Translation of TWI633139B, Tsou et al (Year: 2018).*
Office Action mailed to Taiwanese Counterpart Patent Application No. 111141514 on May 10, 2023.

* cited by examiner

Primary Examiner — Christopher M Rodd
Assistant Examiner — Virginia L Stonehocker
(74) Attorney, Agent, or Firm — Rosenberg, Klein & Lee

(57) ABSTRACT

A recycled poly(ethylene terephthalate) (rPET) blend processing method includes steps: adding a compatibilizer having a porous carbon structure to an rPET blend, wherein the rPET blend includes at least one of PET/PE blend plastic materials and PET/PP blend plastic materials; the porous carbon structure has a diameter ranging from 300 nm to 10 μm and a specific surface area of 300-1500 square meters per gram; mixing the compatibilizer and the rPET blend homogeneously to form a mixture; granulating the mixture to obtain mixture granules; and performing a pre-crystallization process and a solid-state polymerization process of the mixture granules, whereby to recycle and reuse the rPET hard to separate originally and reused, increase the crystallinity of the rPET, and raise the IV value to 0.6 and above.

8 Claims, 5 Drawing Sheets

RECYCLED PET BLEND PROCESSING METHOD

This application claims priority of Application No. 111113038 filed in Taiwan on 6 Apr. 2022 under 35 U.S.C. § 119; the entire contents of all of which are hereby incorporated by reference.

BACKGROUND OF THE INVENTION

Field of the Invention

The present invention relates a technology of recycling and reusing PET, particularly to an rPET blend processing method, which can completely reuse PET/PE blend plastic materials or PET/PP blend plastic materials, which are unlikely to separate originally.

Description of the Prior Art

Poly (ethylene terephthalate) (PET) is a polymeric material having the maximum output and the cheapest price, featuring transparency and superior mechanical properties. PET is extensively used in plastic bottles, package materials, fabrics, etc. The annual output of PET has reached 78.2 megatons in 2020, and the waste thereof is tremendously massive. In order to reduce environmental pollution in land and oceans, many countries, including European Union, United States, and Japan, have established stricter PET recycling standards to raise the PET recycling ratio year by year. Therefore, PET recycling has become an important environmental-protection subject. PET recycling not only reduces carbon dioxide emission but also satisfies the 3R environmental-protection demands (reduce, recycle, and reuse). Further, PET recycling can achieve an energy-saving effect.

However, the separating and recycling of plastic blend waste, such as PET/PE blend waste and PET/PP blend waste (called rPET blend hereinafter), is economically-inefficient and too expensive to practice. Therefore, the plastic blend waste can only be incinerated and buried. Such a plastic blend waste processing technology leads to serious environmental pollution.

Because it lacks stability and rigidity, rPET blend is unlikely to be reused or reshaped. The intrinsic viscosity (IV) of rPET blend is about 0.5 or less. If the intrinsic viscosity of rPET blend can be raised to 0.6 or more, it can satisfy the requirements of mechanical properties and processing-molding performance. Therefore, how to restore or even increase the intrinsic viscosity of rPET blend and the molecular weight thereof is an important topic in processing rPET blend.

The PET/PE blend material or PET/PP blend material contains two or more incompatible plastic materials. The difference of the polarities of the incompatible plastic materials is as much as the difference of the polarities of water and oil. Only the additive having the effect of an interfacial agent can decrease the surface tension between the materials respectively having different polarities and makes them mix homogeneously, whereby the plastic blend can be granulated for usage. The additive is called the compatibilizer. The compatibilizers may be divided into the unreactive types and the reactive types. The reactive type compatibilizer has the function of an interfacial agent to enable the plastic materials having different polarities to mix. Further, the reactive type compatibilizer can form chemical bonds with the recycled plastic materials to enhance the mechanical properties. However, the disadvantage of using the reactive type compatibilizer is that the reactive type compatibilizer must be added by a ratio of at least 0.5%. Thus, the application of the reactive type compatibilizer is limited considering the cost thereof.

SUMMARY OF THE INVENTION

The primary objective of the present invention is to provide a recycled poly (ethylene terephthalate) (rPET) blend processing method, which can mix the PET/PE blend materials or PET/PP blend material compatibly and increase the IV value thereof to 0.6 or more, whereby to overcome the bottleneck of the existing technology and completely reuse rPET blend.

In order to achieve the abovementioned objective, the present invention proposes an rPET blend processing method, which comprises steps: adding a compatibilizer to rPET blend; mixing the compatibilizer and the rPET blend uniformly to form a mixture; granulating the mixture to form PET-containing granules; performing a crystallization process and a solid-state polymerization process of the PET-containing granules in sequence to obtain solid-state polymerized PET blend pellets, which have an IV value of 0.6 and above. In the present invention, rPET blend contains at least one of PET/PE blend and PET/PP blend. The compatibilizer used by the present invention contains porous carbon structures each having a diameter ranging from 300 nm to 10 μm and a specific surface area of 300-1500 square meters per gram.

The compatibilizer used by the present invention can undertake functional group modification, such as amino group modification or carboxyl group modification, so as to enhance the reactivity of compatibilizer and rPET blend.

The proportion of the compatibilizer added to rPET blend ranges from 50 ppm to 2 wt %.

The parameters of the pre-crystallization process and the solid-state polymerization process, such as temperature and time, can be regulated according to requirement of the intended product so as to obtain the desired IV value of the solid-state polymerized PET blend pellets, which are manufactured from rPET blend, whereby to favor the fabrication and application of the related products.

In the present invention, the time of holding temperature is cumulative. A first solid-polymerization process is used to increase the IV value of the solid-state polymerized PET blend pellets to a range enabling a special operation to perform. Then, a second solid-polymerization process further enhances the crystallinity and mechanical strength of the product.

Below, the embodiments will be described in detail to make easily understood the objectives, technical contents, characteristics, and accomplishments of the present invention.

DETAILED DESCRIPTION OF THE INVENTION

Figure 1:
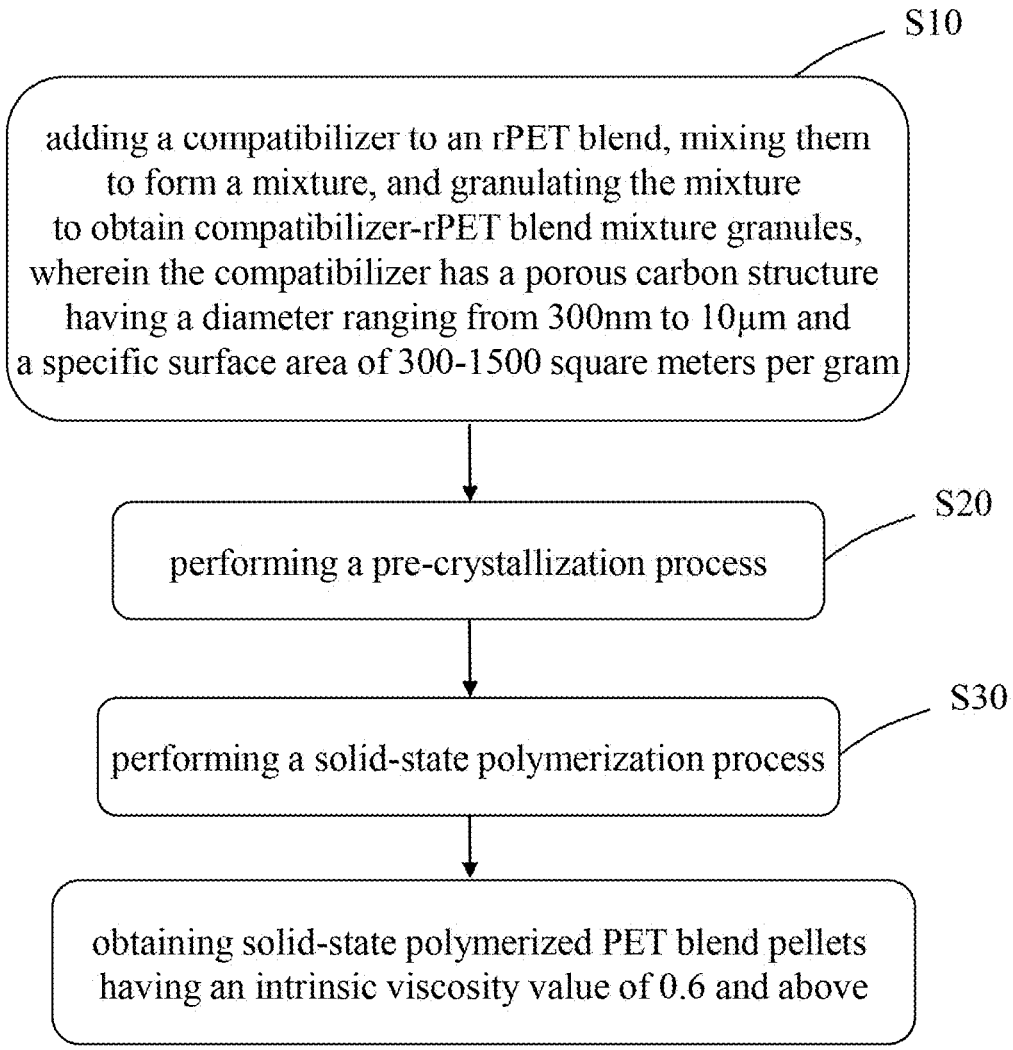
FIG. 1 is a flowchart of an rPET blend processing method according to one embodiment of the present invention.

Refer to FIG. 1 for a flowchart of an rPET blend processing method according to one embodiment of the present invention. The method of the present invention comprises Steps S10-S30.

Firstly, in Step S10, add a compatibilizer, which is adopted by the present invention, to an rPET blend; mix the compatibilizer and the rPET blend uniformly to form a mixture; granulate the mixture to generate polymer nuclei and obtain a plurality of PET-containing granules.

The compatibilizer adopted by the present invention has porous carbon structures, which may be but are not limited to be carbon aerogels. The porous carbon structure has a diameter ranging from 300 nm to 10 μm and a specific surface area of 300-1500 square meters per gram. The porous carbon structure of the compatibilizer can enable the cross-link reaction or dehydration reaction of the polymer chains of the rPET blend to elongate the polymer chains or form networks. Therefore, the compatibilizer may be regarded as a polymer chain extender.

In the present invention, rPET blend contains at least one of PET/PE blend and PET/PP blend. An appropriate amount of compatibilizer may be added to the rPET blend to acquire the required IV value according to the application of rPET blend. It is preferred: the proportion of the compatibilizer added to the rPET blend ranges from 50 ppm to 2 wt %.

Functional group modification, such as amino group modification or carboxyl group modification, may be performed on the porous carbon structures of the compatibilizer used by the present invention so as to enhance the reactivity of compatibilizer and the rPET blend. For example, the porous carbon powder may be modified to obtain a carboxyl-modified compatibilizer powder.

Next, in Step S20, perform a pre-crystallization process of the PET-containing granules. It is preferred: the pre-crystallization process is performed at a temperature of 130-140° C. for a temperature holding time of 2-24 hours in an inert gas and positive pressure environment.

Next, in Step S30, perform a solid-state polymerization process (SSP) of the pre-crystallized PET-containing granules. The solid-state polymerization process is performed at a temperature of 190-230° C. for a temperature holding time of 12-72 hours in a vacuum environment or in an inert gas and positive pressure environment.

After the reaction chamber is cooled down to the ambient temperature naturally, solid-state polymerized PET blend pellets, which have homogeneousness, fine crystallinity, and an increased IV value, are acquired. The solid-state polymerized PET blend pellets have an IV value of 0.6 and above, favoring the succeeding production and application of the related products.

In the present invention, the parameters of the pre-crystallization process and the solid-state polymerization process, such as temperature and time, can be regulated according to requirement of the intended product so as to obtain the desired IV value of the solid-state polymerized PET blend pellets, which are manufactured from rPET blend, whereby to favor the succeeding fabrication and application of the related products of the rPET blend.

In the present invention, the time of holding temperature of the solid-state polymerization process is cumulative. Therefore, in the solid-state polymerization process of Step S30, a first solid-polymerization process is used to increase the IV value of the solid-state polymerized PET blend pellets to a range enabling a special operation (such as fagoting) to perform. Then, a second solid-polymerization process is performed to enhance the crystallinity and mechanical strength of the solid-state polymerized PET blend pellets.

Below, Embodiments I-IV are used to further demonstrate that the method of the present invention can effectively raise the IV value of rPET blend.

Embodiment I

The compatibilizer powder used in Embodiment I has a diameter of 400 nm and a specific surface area of 700 square meters per gram. The compatibilizer powder is added to rPET blend by a weight ratio of 250 ppm. The compatibilizer powder and the rPET blend are mixed homogeneously to form a mixture. The mixture is squeezed out by a twin-screw extruder to form "carbon powder-rPET blend" granules, which is called the compatibilizer-rPET blend mixture granules hereinafter.

Perform a pre-crystallization process and a solid-state polymerization process of the 250 ppm compatibilizer-rPET blend mixture granules to generate solid-state polymerized PET blend pellets. The pre-crystallization process is performed at a temperature of 135° C. for a temperature holding time interval of 3 hours in a nitrogen and positive pressure environment. The solid-state polymerization process is performed at a temperature of 200° C. in a nitrogen and positive pressure environment.

Figure 2:
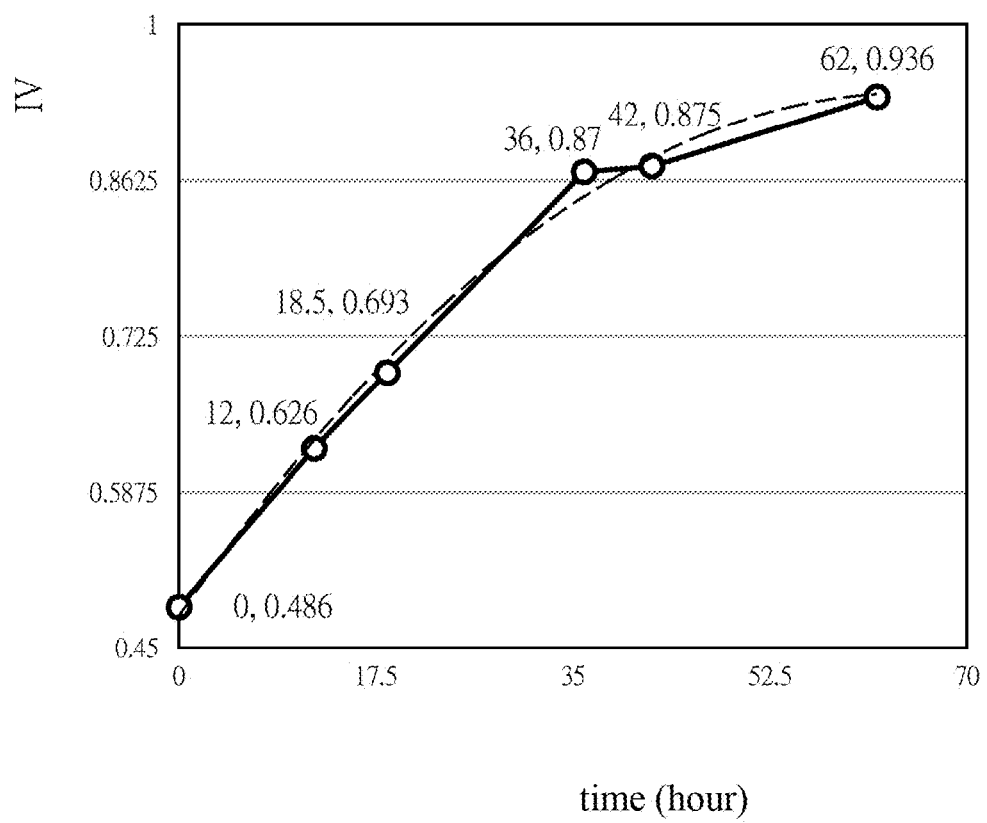
FIG. 2 shows the IV values of the solid-state polymerized PET blend pellets fabricated in Embodiment I, wherein the IV values are measured from the samples taken at different time points during a solid-state polymerization process; the solid curve is plotted with the data measured physically; the dashed curve is acquired through an interpolation and linear regression calculation.

During the solid-state polymerization process, the solid-state polymerized PET blend pellets are sampled for the tests of IV values after the solid-state polymerization process has been undertaken for 12 hours, 18.5 hours, 36 hours, 42 hours, and 62 hours. The measured IV values are plotted with respect to the time at which the solid-state polymerized PET blend pellets are sampled, and an interpolation and linear regression calculation is performed on the measured IV values to obtain the dashed curve shown in FIG. 2, which may be expressed by an equation: $y=-0.0001x^2+0.0141x+0.4809$, wherein y is the IV value; x is the elapsed time; $R^2=0.9963$ (the coefficient of determination), whereby the IV values of the solid-state polymerized PET blend pellets sampled at different time point may be worked out to meet the requirement of the succeeding fabrication. In Embodiment I, the IV values of the solid-state polymerized PET blend pellets sampled at the time points after the process has been undertaken for 12 hours, 18.5 hours, 36 hours, 42 hours, and 62 hours are respectively 0.626, 0.693, 0.87, 0.875, and 0.936.

Embodiment II

The compatibilizer powder used in Embodiment I is also used in Embodiment II. The compatibilizer powder is added to rPET blend by a weight ratio of 150 ppm. The compatibilizer powder and rPET blend are mixed homogeneously to form a mixture. The mixture is squeezed out by a twin-screw extruder to form "150 ppm compatibilizer-rPET blend mixture granules".

Perform a pre-crystallization process and a solid-state polymerization process of the 150 ppm compatibilizer-rPET blend mixture granules to generate solid-state polymerized PET blend pellets. The pre-crystallization process is performed at a temperature of 135° C. for a temperature holding time interval of 3 hours in a nitrogen and positive pressure environment. The solid-state polymerization process is performed at a temperature of 200° C. in a nitrogen and positive pressure environment.

Figure 3:
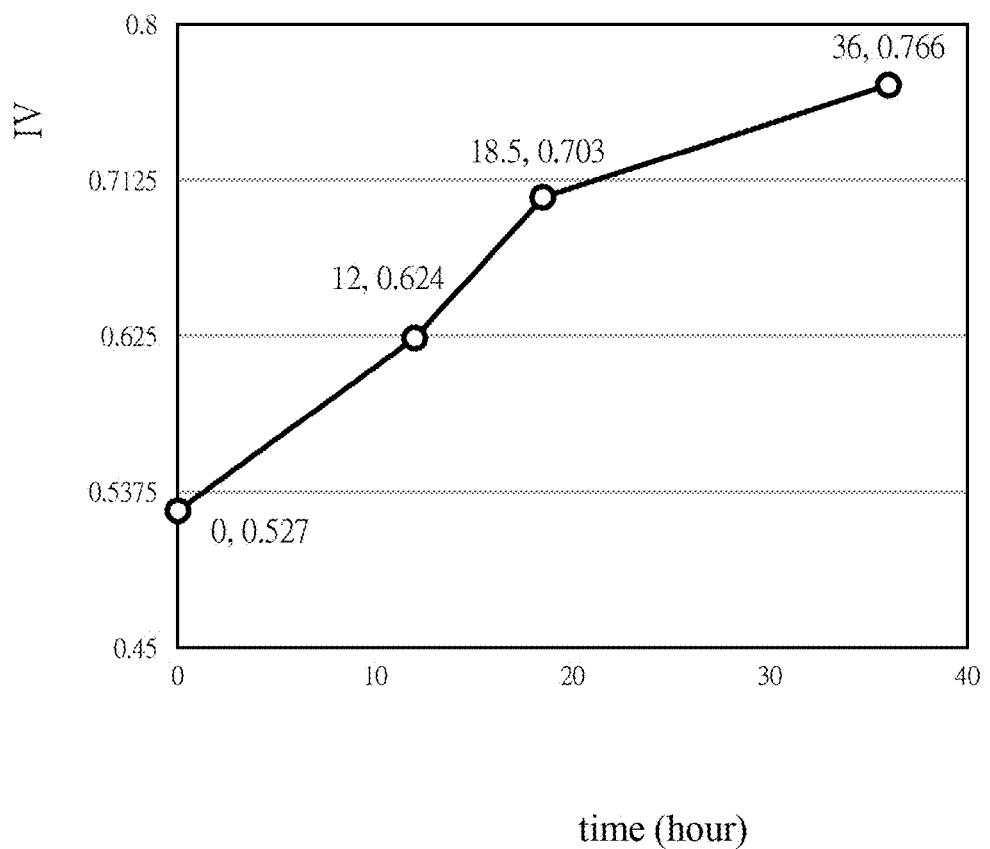
FIG. 3 shows the IV values of the solid-state polymerized PET blend pellets fabricated in Embodiment II, wherein the IV values are measured from the samples taken at different time points during a solid-state polymerization process.

During the solid-state polymerization process, the solid-state polymerized PET blend pellets are sampled for the tests of IV values after the solid-state polymerization process has been undertaken for 12 hours, 18.5 hours, and 36 hours. The measured IV values are plotted with respect to the time at which the solid-state polymerized PET blend pellets are sampled, and an interpolation and linear regression calculation is performed on the measured IV values to obtain a curve shown in FIG. 3, whereby the IV values of the solid-state polymerized PET blend pellets sampled at different time point may be worked out to meet the requirement of the succeeding fabrication. In Embodiment II, the IV values of the solid-state polymerized PET blend pellets sampled at the time points after the process has been undertaken for 12 hours, 18.5 hours and 36 hours, 42 hours, and 62 hours are respectively 0.624, 0.703, and 0.766.

Embodiment III

The compatibilizer powder used in Embodiment III has a diameter of 10 μm and a specific surface area of 590 square meters per gram. The compatibilizer powder is added to rPET blend by a weight ratio of 500 ppm. The compatibilizer powder and rPET blend are mixed homogeneously to form a mixture. The mixture is squeezed out by a twin-screw extruder to form 500 ppm compatibilizer-rPET blend mixture granules.

Perform a pre-crystallization process and a solid-state polymerization process of the 500 ppm compatibilizer-rPET blend mixture granules to generate solid-state polymerized PET blend pellets. The pre-crystallization process is performed at a temperature of 135° C. for a temperature holding time interval of 3 hours in a nitrogen and positive pressure environment. The solid-state polymerization process is performed at a temperature of 200° C. in a nitrogen and positive pressure environment.

Figure 4:
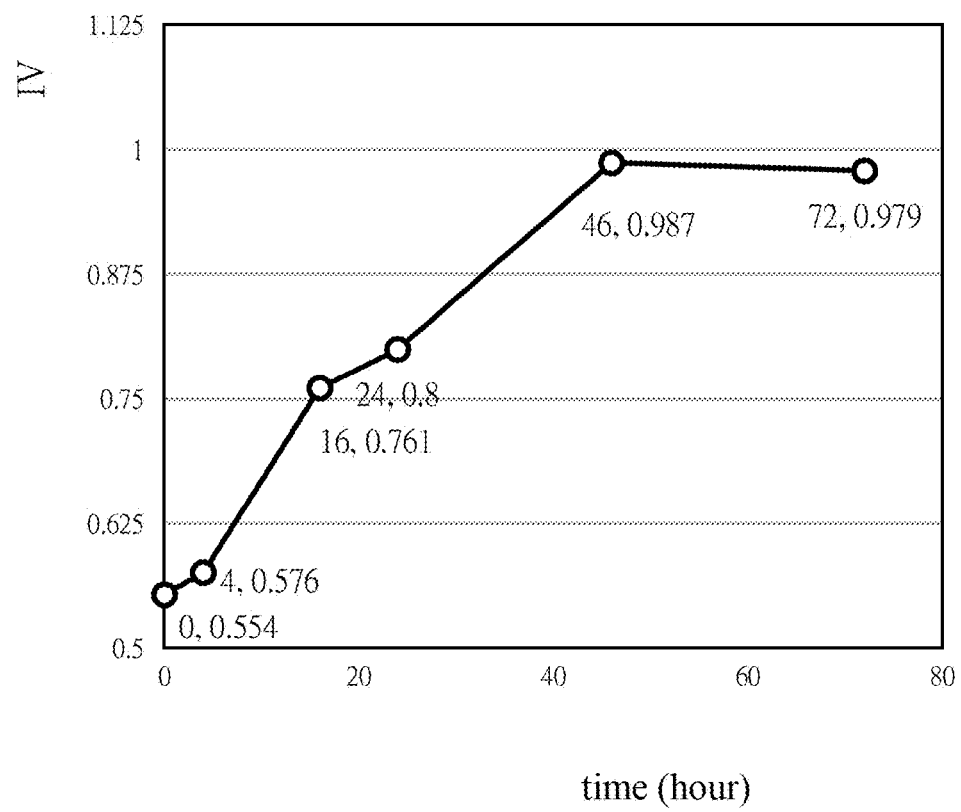
FIG. 4 shows the IV values of the solid-state polymerized PET blend pellets fabricated in Embodiment III, wherein the IV values are measured from the samples taken at different time points during a solid-state polymerization process.

During the solid-state polymerization process, the solid-state polymerized PET blend pellets are sampled for the tests of IV values after the process has been undertaken for 4 hours, 16 hours, 34 hours, 46 hours, and 72 hours, as shown in FIG. 4. In Embodiment III, the IV values of the solid-state polymerized PET blend pellets sampled at the time points after the solid-state polymerization process has been undertaken for 4 hours, 16 hours, 34 hours, 46 hours, and 72 hours are respectively 0.576, 0.761, 0.8, 0.987 and 0.979. The concentration of the compatibilizer powder used in Embodiment III is two times the concentration of the compatibilizer powder used in Embodiment I. Although the compatibilizer powder used in Embodiment III has a diameter larger than the diameter of the compatibilizer powder used in Embodiment I, the rising modes of IV values of Embodiment III and Embodiment I are almost the same, and both the curves of IV values of Embodiment III and Embodiment I rise steeply. It indicates: the higher the concentration of the compatibilizer powder, the more effectively the IV value is raised. On the other hand, the smaller the diameter of the compatibilizer powder, the less the amount of the compatibilizer powder required to achieve the same IV value. In the case of a smaller diameter and a less amount of the compatibilizer powder, a longer time interval is needed to achieve the same IV value.

Embodiment IV

Similar to Embodiment III, Embodiment IV uses the compatibilizer powder having a diameter of 10 μm and a specific surface area of 590 square meters per gram, and the compatibilizer powder is added to rPET blend by a weight ratio of 500 ppm. The compatibilizer powder and rPET blend are mixed homogeneously to form a mixture. The mixture is squeezed out by a twin-screw extruder to form 500 ppm compatibilizer-rPET blend mixture granules.

Perform a pre-crystallization process and a solid-state polymerization process of the 500 ppm compatibilizer-rPET blend mixture granules to generate solid-state polymerized PET blend pellets. The pre-crystallization process is performed at a temperature of 135° C. for a temperature holding time interval of 3 hours in an atmospheric environment. The solid-state polymerization process is performed at a temperature of 200° C. in an atmospheric environment.

During the solid-state polymerization process, the solid-state polymerized PET blend pellets are sampled for the tests of IV values after the solid-state polymerization process has been undertaken for 16 hours, 24 hours, and 46 hours. It is found: the IV values are too low to detect. It indicates that the atmospheric environment may cause PET to crack.

Embodiment V

The compatibilizer powder and the pre-crystallization process used in Embodiment V are the same as those used in Embodiment III. However, the solid-state polymerization process of Embodiment V is performed at a temperature of 200° C. in a vacuum environment. The solid-state polymerized PET blend pellets are sampled for the test of the IV value after the solid-state polymerization process has been undertaken for 72 hours. The IV value is about 0.78. It indicates that the solid-state polymerization process is more efficient in the nitrogen environment than in the vacuum environment.

Embodiment VI

In Embodiment VI, the processes used in Embodiment III are user to fabricate the samples of the solid-state polymerized PET blend pellets. After the solid-state polymerization process has been undertaken for 24 hours, the process is terminated to collect the samples. The samples fabricated with 200 ppm compatibilizer have an IV value of 0.85.

The solid-state polymerized PET blend pellets are used to fabricate tensile test specimens. The tensile test specimens are placed in a baker and treated with a second solid-state polymerization process (at a temperature of 200° C. for a temperature holding time interval of 48 hours in a nitrogen and positive pressure environment). The test results show that the tensile strength is further increased. Table.1 shows the tensile test results of the test specimens of Embodiment VI and ordinary packing tapes.

TABLE 1

| Group | Tensile strength (Kgf/cm2) | Breaking elongation (%) |
| --- | --- | --- |
| Embodiment VI | 4090 | 5.87 |
| PET packing tape (high strength tape) | 4000 | 8~12 |
| PET packing tape (standard tape) | 3500 | 12~18 |

Embodiment VII In Embodiment VII, the compatibilizer powder is added to the blend of rPET+rPE by a weight ratio of 500 ppm; the compatibilizer powder and the blend of rPET+rPE are mixed homogeneously to fabricate solid-state polymerized PET blend pellets, wherein the proportions of rPET and rPE are respectively 80% and 20%. The melt index (MI) of the sample is 14.4 (according to the test method in ASTM D1238).

Figure 5:
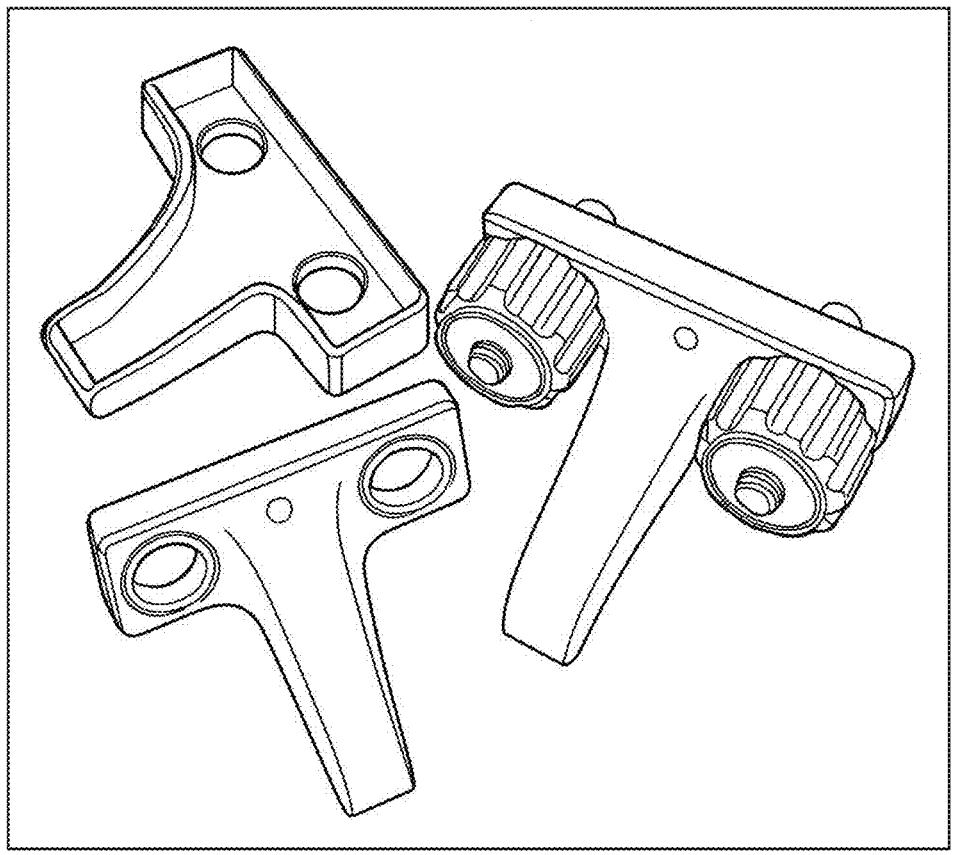
FIG. 5 shows the appearance of the plastic faucet fabricated via mold-injecting the solid-state polymerized PET blend pellets in Embodiment VII.

The solid-state polymerized PET blend pellets are used to fabricate plastic faucets, as shown in FIG. 5. In visual inspection, the plastic faucets are uniform in tincture. It indicates: the blend of rPET+rPE and the compatibilizer powder indeed become a homogeneous solution after pelletization. None of the faucets is damaged after more than 10 cycles of drop tests. It indicates that the products fabricated via mold-injecting the solid-state polymerized PET blend pellets have the strength and toughness meeting the utilization standard.

In conclusion, the rPET blend processing method of the present invention is characterized in adding a porous carbon-structured compatibilizer to rPET blend; and controlling the parameters of a pre-crystallization process and a solid-state polymerization process to increase the crystallinity of the rPET blend and raise the IV value of the rPET blend to 0.6 and above. The PET blend plastic material fabricated thereby meets the requirement of fabricating the succeeding products. Therefore, the method of the present invention can completely reuse rPET blend in tons scale. The benefit generated therefrom favors the sustainable development of the recycling industry.

The embodiments described above are only to exemplify the present invention but not to limit the scope of the present invention. The persons having ordinary knowledge in the art should be able to make various modifications and variations easily according to the technical contents disclosed by the present invention. However, these modifications and variations are to be also included by the scope of the present invention, which is based on the claims stated below.

What is claimed is:

1. A recycled poly (ethylene terephthalate) (rPET) blend processing method, comprising steps:

adding a compatibilizer to an rPET blend, mixing the compatibilizer and the rPET blend homogeneously to form a compatibilizer-rPET blend mixture, and granulating the compatibilizer-rPET blend mixture to obtain a plurality of compatibilizer-rPET blend mixture granules, wherein the rPET blend includes at least one of PET/PE blend plastic materials and PET/PP blend plastic materials; the compatibilizer has a porous carbon structure; the porous carbon structure has a particle diameter ranging from 300 nm to 10 μm and a specific surface area of 300-1500 square meters per gram; and performing a pre-crystallization process and a solid-state polymerization process of the compatibilizer-rPET blend mixture granules to generate a plurality of solid-state polymerized PET blend pellets having an intrinsic viscosity value of 0.6 and above.

2. The recycled PET blend processing method according to claim 1, wherein the porous carbon structure is a carbon aerogel.

3. The recycled PET blend processing method according to claim 1, wherein the porous carbon structure is modified by a functional group.

4. The recycled PET blend processing method according to claim 3, wherein the functional group is an amino group or a carboxyl group.

5. The recycled PET blend processing method according to claim 1, wherein the compatibilizer is added to the rPET blend by a weight ratio of 50 ppm to 2 wt %.

6. The recycled PET blend processing method according to claim 1, wherein the pre-crystallization process is performed at a temperature of 130-140° C. for a temperature holding time interval of 2-24 hours in an inert gas and positive pressure environment.

7. The recycled PET blend processing method according to claim 1, wherein the solid-state polymerization process is performed at a temperature of 190-230° C. for a temperature holding time interval of 12-72 hours in a vacuum/inert gas or positive pressure environment.

8. The recycled PET blend processing method according to claim 1, wherein the solid-state polymerization process includes a first solid-state polymerization process used to increase the intrinsic viscosity value of the solid-state polymerized PET blend pellets to an operable range; and a second solid-state polymerization process used to increase crystallinity and mechanical strength of the solid-state polymerized PET blend pellets.

* * * * *